United States Patent
Nakahashi (10) Patent No.: US 11,810,742 B2
(45) Date of Patent: Nov. 7, 2023

(54) PROJECTILE ASSEMBLY AND ELECTRIC CIRCUIT BREAKER DEVICE

(71) Applicant: DAICEL CORPORATION, Osaka (JP)

(72) Inventor: Katsuhiro Nakahashi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 340 days.

(21) Appl. No.: 17/420,440

(22) PCT Filed: Feb. 28, 2020

(86) PCT No.: PCT/JP2020/008293
§ 371 (c)(1),
(2) Date: Jul. 2, 2021

(87) PCT Pub. No.: WO2020/179663
PCT Pub. Date: Sep. 10, 2020

(65) Prior Publication Data
US 2022/0084765 A1 Mar. 17, 2022

(30) Foreign Application Priority Data
Mar. 1, 2019 (JP) .................. 2019-037135

(51) Int. Cl.
*H01H 39/00* (2006.01)
*F41F 7/00* (2006.01)
*F42B 3/12* (2006.01)

(52) U.S. Cl.
CPC ............. *H01H 39/006* (2013.01); *F41F 7/00* (2013.01); *F42B 3/12* (2013.01)

(58) Field of Classification Search
CPC ...... H01H 39/00–006; H01H 2039/008; F41F 7/00; F42B 3/12; F42C 19/12
See application file for complete search history.

(56) References Cited

U.S. PATENT DOCUMENTS 2,712,575 A * 7/1955 Kiel .................... H01H 39/004
    337/414
6,222,439 B1   4/2001 Tanigawa et al.
    (Continued)

FOREIGN PATENT DOCUMENTS

| JP | 11-232979 A | 8/1999 |
| JP | 2014-49300 A | 3/2014 |
| JP | 2016-85947 A | 5/2016 |

OTHER PUBLICATIONS

International Preliminary Report on Patentability and Written Opinion of the International Searching Authority for International Application No. PCT/JP2020/008293, dated Aug. 25, 2021, with English Translation.

(Continued)

*Primary Examiner* — Jacob R Crum
(74) *Attorney, Agent, or Firm* — Birch, Stewart, Kolasch & Birch, LLP (57) ABSTRACT

[Problem]
Provided is a method for manufacturing an assembly including an igniter, a projectile, and a cylinder that is easy to assemble.
[Solution]
A method for manufacturing an assembly included in an electric circuit breaker device, the assembly including an igniter, a projectile, and a cylinder, is a method for disposing a projectile and an igniter in a cylinder of an electric circuit breaker device, the method including: a first step of preparing a cylinder having a first opening, a plurality of through holes formed at intervals in a circumferential direction in a peripheral wall portion on a first opening side, and a second opening, and disposing a projectile in the cylinder; a second step of disposing an igniter main body portion in the cylinder and then disposing the cylinder in a mold; a third step of injection-molding a resin from the first opening side of the (Continued)

cylinder to form a resin portion; a fourth step of removing the cylinder including the projectile and the igniter from the mold; and a fifth step of crimping a peripheral wall portion on the first opening side of the cylinder to fix the resin portion of the igniter.

12 Claims, 4 Drawing Sheets

(56) References Cited

U.S. PATENT DOCUMENTS

| | | | |
|---|---|---|---|
| 6,556,119 B1* | 4/2003 | Lell | H01H 37/323 337/182 |
| 2005/0083164 A1 | 4/2005 | Caruso et al. | |
| 2005/0083165 A1 | 4/2005 | Tirmizi | |
| 2008/0137253 A1* | 6/2008 | George | H01H 39/006 29/428 |
| 2010/0218659 A1* | 9/2010 | Ukon | B23D 15/145 83/639.1 |
| 2012/0234162 A1 | 9/2012 | Tirmizi | |
| 2014/0061161 A1 | 3/2014 | Nakamura et al. | |
| 2014/0326122 A1* | 11/2014 | Ukon | B23D 15/145 83/468.1 |
| 2017/0221662 A1 | 8/2017 | Sakai | |
| 2020/0279711 A1* | 9/2020 | Mathieu | H01H 85/0039 |

OTHER PUBLICATIONS

International Search Report for International Application No. PCT/JP2020/008293, dated May 26, 2020.

* cited by examiner

PROJECTILE ASSEMBLY AND ELECTRIC CIRCUIT BREAKER DEVICE

TECHNICAL FIELD

The present disclosure, in some aspects thereof, relates to a projectile assembly that can instantly move a projectile by operation of an igniter, a method for manufacturing the same, an electric circuit breaker device that can be used in electric circuits of an automobile, a household appliance, and the like, and a method for manufacturing the same.

BACKGROUND ART

For example, in electric circuits of an automobile, a home appliance, or the like, or in an entire system including the electric circuits, under abnormal conditions of the electric circuits themselves, the entire system, or the like, there is used an electric circuit breaker device that interrupts the electric circuits to prevent great damage. The electric circuit breaker device is becoming important particularly for electric circuits of an electric vehicle, for example. As the electric circuit breaker device, there is known an electric circuit breaker device in which an igniter, a projectile (piston), a conductor, and the like are accommodated in a housing, as described in Patent Documents described below.

In breaker devices described in US 2005/0083164 A and US 2005/0083165 A, as a material of a housing, a metal, a ceramic, and a polymer are exemplified, and it is described that a certain polymer is preferable (pages 2 to 3 of US 2005/0083164 A, page 2 of US 2005/0083165 A).

A breaker device having a housing made of a metal or a plastic is also described in US 2012/0234162 A. In a breaker device of JP H11-232979 A, a casing 13 is made of stainless steel (paragraph number 0011). In a breaker device of JP 2014-49300 A, a case 30 is formed of a material having an electrical insulating property and high strength (e.g., a resin material) (paragraph number 0034).

When a polymeric material (resin material) is used as a material of a housing, the housing (casing) needs to be thickened in terms of imparting a required strength as can be understood from, for example, FIG. 1 of each of US 2005/0083164 A, US 2005/0083165 A, and JP 2014-49300 A. When the casing 13 of stainless steel is used as in JP H11-232979 A, increase in mass becomes greater and an insulating case 14 needs to be disposed in combination, thereby complicating the structure and assembly. In an electric circuit breaker device described in JP 2016-85947 A, a metal cylinder is used to reinforce a housing made of a resin, resulting in an effect that is not achieved by the devices described in the above-mentioned Patent Documents.

It is an object of the present disclosure, in some aspects thereof, to provide a projectile assembly that can instantly move a projectile by operation of an igniter, a method for manufacturing the same, an electric circuit breaker device that is easy to assemble, and a method for manufacturing the same.

The present disclosure provides, in one exemplary embodiment thereof, a projectile assembly in which a projectile and an igniter are accommodated and disposed in a cylinder, in which the cylinder includes a first opening, a second opening axially opposite to the first opening, and a plurality of through holes formed at intervals in a circumferential direction in a peripheral wall portion on the first opening side, the igniter includes: an igniter main body portion provided with an ignition portion and an electro-conductive pin; and a resin portion surrounding the igniter main body portion, the resin portion closes the first opening and the plurality of through holes of the cylinder and is abutted against an inner wall surface around the through holes of the cylinder, the projectile is made of a synthetic resin, the igniter is disposed on the first opening side in the cylinder and the projectile is disposed between the igniter and the second opening in the cylinder, and both a peripheral wall portion on the first opening side and a peripheral wall portion on the second opening side of the cylinder are crimped inward to form a first crimped portion and a second crimped portion, and the first crimped portion is abutted against the resin portion of the igniter.

In the projectile assembly according to this example of the present disclosure, the projectile and the igniter are accommodated and disposed in the cylinder. The cylinder is an outer shell container, and includes the first opening, the second opening axially opposite to the first opening, and the plurality of through holes formed at intervals in the circumferential direction in the peripheral wall portion on the first opening side. The number of through holes is not particularly limited, and for example, 2 to 6 through holes can be provided in the peripheral wall portion axially adjacent to the first opening at regular intervals or at different intervals in the circumferential direction. The shape and the size of each of the through holes are not particularly limited as long as the object of fixing the resin portion can be achieved. As a material of the cylinder, what is selected from a metal such as stainless steel or aluminum and a fiber reinforced resin such as a carbon fiber reinforced resin can be used.

The projectile has a shape and a size that can be accommodated in the cylinder. The projectile includes a synthetic resin and the resin material can be selected depending on the application. Upon selection, a required degree of electrical insulating property or weight reduction, strength, and the like may be considered.

According to one example, the projectile may have a cylindrical shape having an identical outer diameter throughout its length or may have a partially different outer diameter. In a case where the projectile includes portions having different outer diameters, when the projectile is disposed in the cylinder, from the first opening side toward the second opening side, a combination of a large diameter portion and a small diameter portion, a combination of a small diameter portion and a large diameter portion, a combination of a small diameter portion, a large diameter portion, and a small diameter portion, and a combination including an intermediate diameter portion formed at a desired position can be used. Note that there is a relationship of an outer diameter of the small diameter portion<an outer diameter of the intermediate diameter portion<an outer diameter of a large diameter cylindrical portion.

In a case where the projectile includes portions having different outer diameters, there can be used a projectile in which a step portion composed of different outer diameters is an annular flat surface (an angle between the large diameter portion or the small diameter portion and the annular plane is approximately 90 degrees) or the step portion is an annular inclined surface. The angle of the annular flat surface or the annular inclined surface of the step portion preferably corresponds to an angle of an inner surface of the second crimped portion.

According to one example, an inner peripheral surface of the cylinder and an outer peripheral surface of the projectile may be in contact with each other, but to facilitate movement during operation, a slight gap is preferably formed between the inner peripheral surface of the cylinder and the outer peripheral surface of the projectile. A cross-sectional shape in a width direction (radial direction) of the cylinder and a cross-sectional shape of the projectile are preferably the same but may be partially different.

The igniter may be a known igniter used in an electric circuit breaker device or a gas generator of an airbag device in an automobile. In one example, the igniter may include: an igniter main body portion provided with an ignition portion having an ignition charge and an electro-conductive pin for energization; and a resin portion surrounding the igniter main body portion, and during operation, the igniter is energized from an external power source to combust the ignition charge, thereby generating a combustion product such as a combustion gas or flames.

According to one example of the present disclosure, in the projectile assembly, the igniter is accommodated and disposed in the cylinder on the first opening side of the cylinder, that is, close to the first opening, and the projectile is accommodated and disposed between the igniter and the second opening of the cylinder. The igniter can be made, for example, by injection-molding a resin that becomes a resin portion in the cylinder, so that the igniter main body portion is integrated with the cylinder via the resin. According to one example, the projectile can also be formed by injection-molding a resin into the cylinder.

According to one example, the igniter is disposed such that the resin portion closes the first opening and the plurality of through holes of the cylinder and is in contact with the inner wall surface around the through holes of the cylinder. Preferably, the peripheral wall portion on the first opening side of the cylinder is crimped inward to be abutted against the resin portion, thereby fixing the igniter to the cylinder.

According to one example, the projectile assembly of the present disclosure operates such that the projectile jumps out of the second opening of the cylinder by receiving pressure due to a combustion product generated by operation of the igniter in the cylinder, and the projectile that has jumped out is caused to collide with a different member to cut, push out, or deform the different member, so that a unique effect can be obtained. At this time, the projectile may completely jump out of the cylinder or may partially remain in the cylinder.

According to one example, in a preferred embodiment of the projectile assembly of the present disclosure, the projectile includes the large diameter portion on the first opening side of the cylinder, that is, facing the first opening, the small diameter portion on the second opening side of the cylinder, that is, facing the second opening, and a relationship of an outer diameter (d1) of the large diameter portion>an outer diameter (d2) of the small diameter portion, and an inner diameter (id) of a portion of the second opening of the cylinder, in which the second crimped portion is present, has a relationship of d1>id≥d2.

In the present embodiment, the relationship of d1>id≥d2 causes the small diameter portion of the projectile to jump out of the cylinder, and causes the large diameter portion to remain in the cylinder, during operation.

According to another exemplary embodiment, the present disclosure provides an electric circuit breaker device in which, in a housing made of a synthetic resin, an igniter, a projectile made of a synthetic resin, and a conductor piece for forming a part of an electric circuit are disposed in this order from a first end portion side of the housing toward a second end portion side on an opposite side in a housing axial direction, and an insulated space is closed between the second end portion and the conductor piece, a cylinder is disposed in the housing, and the igniter and the projectile are disposed in the cylinder, the cylinder includes a first opening on the first end portion side of the housing, a second opening on the second end portion side of the housing, and a plurality of through holes formed at intervals in a circumferential direction in a peripheral wall portion on the first opening side, the igniter includes: an igniter main body portion provided with an ignition portion and an electro-conductive pin; and a resin portion surrounding the igniter main body portion, the resin portion closes the first opening and the plurality of through holes of the cylinder and is abutted against an inner wall surface around the through holes of the cylinder, both a peripheral wall portion on the first opening side and a peripheral wall portion on the second opening side of the cylinder are crimped inward to form a first crimped portion and a second crimped portion, and the first crimped portion is abutted against the resin portion of the igniter, the conductor piece is a plate piece including a first connection portion and a second connection portion on both ends and a cut portion at an intermediate portion of these connection portions and a surface of the cut portion is disposed perpendicularly to the housing axial direction, and the projectile is opposed to the cut portion of the conductor piece in the housing axial direction.

In this example, the housing is made of a synthetic resin and has an external shape determined appropriately in accordance with an attachment site. The housing has a shape, structure, and size that allow components such as the igniter, the projectile, the cylinder, and the conductor piece to be accommodated and installed therein.

The igniter may be a known igniter used in an electric circuit breaker device or may be an igniter used in a gas generator of an airbag device in an automobile, for example. In one example, the igniter may include: an igniter main body portion provided with an ignition portion having an ignition charge and an electro-conductive pin for energization; and a resin portion surrounding the igniter main body portion, and during operation, the igniter is energized from an external power source to combust the ignition charge, thereby generating a combustion product such as a combustion gas or flames.

According to one example, as the conductor piece, it is possible to use the same conductor piece as that used in a known electric circuit breaker device. According to one example, the conductor piece may be a plate piece including connection portions on both ends (a first connection portion and a second connection portion) and a cut portion at an intermediate portion of these connection portions, and the conductor piece forms a part of an electric circuit when attached to the electric circuit. A shape of the conductor piece may be a shape corresponding to a shape and structure of a portion of the housing to which the conductor piece is attached.

According to one example, the projectile can block an electric circuit by receiving pressure of a combustion product generated by operation of the igniter to move toward the second end portion side axially in the housing and cutting the conductor piece. An end surface of the projectile may be abutted against the cut portion, or may face the cut portion at a distance. The projectile is made of a resin and in one example, the same synthetic resin as the housing can be used. The resin is not particularly limited, and can be selected as appropriate in accordance with a required strength, formability, electrical insulating properties, and the like.

According to one example, the cylinder is for reinforcing the housing and includes the first opening on the first end portion side of the housing, that is, closer to the first end portion, the second opening in the second end portion side of the housing, that is, closer to the second end portion and axially opposite to the first opening, and the plurality of through holes formed at intervals in the circumferential direction on the first opening side, that is, in the peripheral wall portion of the cylinder near the first opening. The number of through holes is not particularly limited, and for example, 2 to 6 through holes can be provided in the peripheral wall portion axially adjacent to the first opening at regular intervals or at different intervals in the circumferential direction. The shape and size of each of the through holes are not particularly limited as long as the object of fixing the resin portion can be achieved.

As a material of the cylinder, what is selected from a metal such as stainless steel or aluminum and a fiber reinforced resin such as a carbon fiber reinforced resin can be used. The inner wall surface of the housing and the outer peripheral surface of the cylinder are preferably in contact with each other.

According to one example, an inner peripheral surface of the cylinder and an outer peripheral surface of the projectile may be in contact with each other, but to facilitate movement during operation, a slight gap is preferably formed between the inner peripheral surface of the cylinder and the outer peripheral surface of the projectile. A cross-sectional shape in the width direction (radial direction) of the cylinder and a cross-sectional shape of the projectile are preferably the same but may be partially different.

The igniter and the projectile are accommodated and disposed in the cylinder and in one example, the igniter is accommodated and disposed in the cylinder on the first opening side of the cylinder, that is, close to the first opening, and the projectile is accommodated and disposed between the igniter and the second opening of the cylinder. The igniter can be made, for example, by injection-molding a resin that becomes a resin portion in the cylinder, so that the igniter main body portion is integrated with the cylinder via the resin.

According to one example, the igniter is disposed such that the resin portion closes the first opening and the plurality of through holes of the cylinder and is disposed in contact with the inner wall surface around the through holes of the cylinder. According to one example, the igniter is fixed to the cylinder, by the resin portion closing the through holes of the cylinder and by the peripheral wall portion on the first opening side of the cylinder being crimped inward.

According to one example, as described in JP 2018-6081 A, the electric circuit breaker device of the present disclosure can be configured such that the projectile axially moves when the igniter operates, and the end surface cuts the cut portion of the conductor piece and then breaks a gas outlet of a gas filling space, a protrusion of which is closed, to discharge gas into the insulated space. When the cut portion is cut in this way, electricity is disconnected to interrupt the electric circuit, and gas is discharged into the insulated space, so that even when an arc is generated, the arc is quickly extinguished.

According to one example, in a preferred embodiment of the electric circuit breaker device of the present disclosure, the resin portion of the igniter includes a first disc portion, a second disc portion, a third disc portion, and a fourth disc portion formed in this order from the ignition portion side toward the electro-conductive pin side,
 a peripheral surface of the first disc portion is abutted against the inner wall surface of the cylinder,
 the second disc portion has a non-uniform outer diameter having recesses and protrusions on a peripheral surface, and protruding portions of the recesses and protrusions enter the plurality of through holes on the first opening side of the cylinder,
 an outer diameter (D1) of the first disc portion and an outer diameter (D3) of the third disc portion are the same, and a peripheral surface of the third disc portion is abutted against the inner wall surface of the cylinder,
 an annular surface is formed between the third disc portion and the fourth disc portion by the outer diameter (D3) of the third disc portion and an outer diameter (D4) of the fourth disc portion having a relationship of D3>D4, and
 the peripheral wall portion on the first opening side of the cylinder is crimped inward to form the first crimped portion, and the first crimped portion is abutted against the annular surface.

The igniter is integrated with the cylinder via, for example, an injection-molded resin portion, and thus, the resin portion can have an outer shape corresponding to the shape of the cylinder. The annular surface due to the difference in outer diameter is formed between the third disc portion and the fourth disc portion, so that the first crimped portion is easily abutted against the annular surface to be fixed.

In another preferred embodiment of the electric circuit breaker device of the present disclosure, the projectile includes a large diameter portion on the first end portion side of the housing, that is, closer to the first end portion of the housing, and a small diameter portion on the second end portion side of the housing, that is, closer to the second end portion of the housing, and has a relationship of an outer diameter (d1) of the large diameter portion>an outer diameter (d2) of the small diameter portion, and
 an inner diameter (id) of the second opening of the cylinder has a relationship of d1>id≥d2.

The second opening of the cylinder can satisfy the relationship of d1>id≥d2, for example, by forming an annular portion protruding inward. When the relationship of d1>id≥d2 is satisfied, the second opening of the cylinder functions as a stopper for the projectile (large diameter portion of the projectile) during operation. In yet another example, instead of forming a stopper for the projectile in the cylinder, it is possible to form a stopper for the projectile in the housing.

According to one example, in another preferred embodiment of the electric circuit breaker device of the present disclosure, the projectile includes a large diameter portion on the first end portion side of the housing, that is, closer to the first end portion of the housing, and a small diameter portion on the second end portion side of the housing, that is, closer to the second end portion of the housing, and has a relationship between an outer diameter (d1) of the large diameter portion>an outer diameter (d2) of the small diameter portion, and the ignition portion of the igniter is disposed in a state of entering a recessed portion formed in the large diameter portion.

When the ignition portion of the igniter is disposed in a state of entering the recessed portion formed in the large diameter portion, the entire pressure of a combustion product generated from the igniter during operation collides with the large diameter portion of the projectile, which is preferable.

The present disclosure also provides, in one embodiment, a method for manufacturing the assembly including an igniter, a projectile, and a cylinder described above, the manufacturing method including:
  a first step of preparing a cylinder having a first opening, a plurality of through holes formed at intervals in a circumferential direction in a peripheral wall portion on a first opening side, and a second opening, disposing an igniter main body portion in the cylinder, and then disposing the cylinder and an igniter in a mold;
  a second step of injecting a resin from the first opening side of the cylinder to form a resin portion of the igniter;
  a third step of injecting a resin from a second opening side of the cylinder to form a projectile; and
  a fourth step of crimping both the peripheral wall portion on the first opening side and a peripheral wall portion on the second opening side to form a first crimped portion and a second crimped portion, and fixing the resin portion of the igniter by the first crimped portion to obtain the assembly.

The present disclosure also provides, in one embodiment, a method for manufacturing an electric circuit breaker device including an assembly including an igniter, a projectile, and a cylinder in a housing. According to one example, the manufacturing method can include disposing the assembly including the igniter, the projectile, and the cylinder manufactured as described above in the housing.

The electric circuit breaker device of the present disclosure includes an assembly in which a projectile and an igniter are accommodated in a cylinder as a component, and as exemplified above, the assembly can be formed by injection-molding a resin in a state where an igniter main body portion is disposed in a cylinder to form a resin portion and then injection-molding a resin into the cylinder to form a projectile.

As a result, an operation of press-fitting the igniter and the projectile to the cylinder becomes unnecessary, and there is no load during attachment on the igniter or the projectile. In addition, there is no clearance in a contact portion between the cylinder and the projectile, which eliminates a need for an O-ring disposed between the cylinder and the projectile.

Furthermore, the projectile formed by injection-molding a resin is in a state of sticking to an inner wall surface of the cylinder after forming, and thus, even when subjected to external vibrations, the projectile does not move axially in a state prior to operation, and problems such as colliding with and cutting the conductor piece do not occur.

Furthermore, the distance between the projectile and the conductor piece is ensured, so that a kinetic energy during operation can also be used.

DESCRIPTION OF EMBODIMENTS

Electric Circuit Breaker Device

An embodiment of an exemplary electric circuit breaker device 1 according to the present disclosure will be described with reference to FIG. 1. A housing (resin housing) 10 made of a synthetic resin includes a cylindrical space 13 in which a first end portion 11 side is open and a second end portion 12 side is closed.

In the cylindrical space 13 of the housing 10, an igniter 20, a projectile 40 made of a synthetic resin, a conductor piece 50, and an insulated space 60 are disposed in this order from the first end portion 11 side to the second end portion 12 side.

Figure 1:
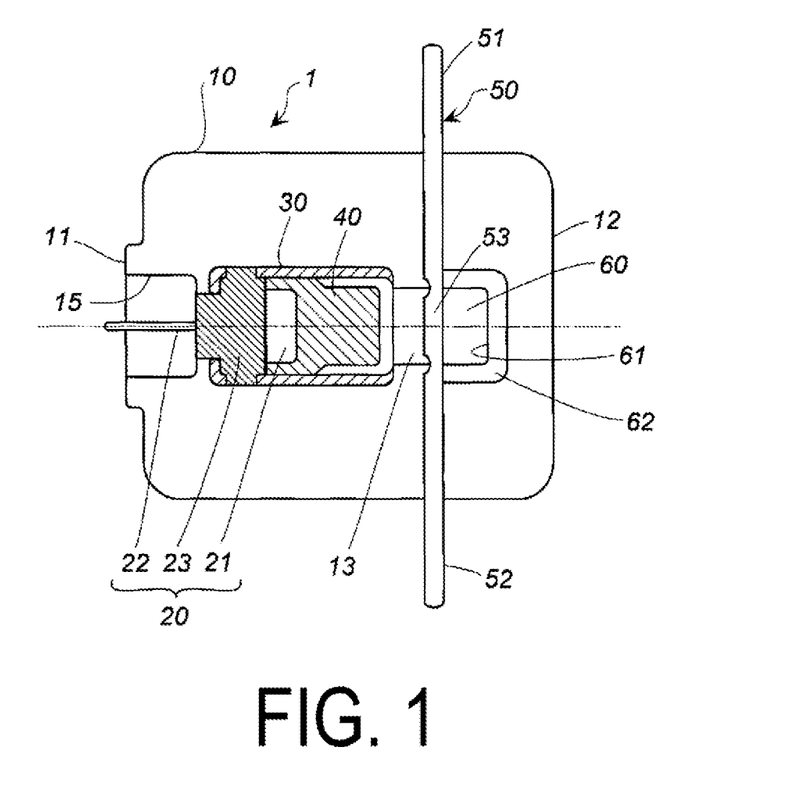
FIG. 1 is an axially cross-sectional view of an electric circuit breaker device according to an example of the present disclosure.

As illustrated in FIG. 1, the electric circuit breaker device 1 includes an assembly 2 (FIG. 2) in which the igniter 20 and the projectile 40 are accommodated and disposed in a cylinder 30. As illustrated in FIG. 3, the cylinder 30 includes a first opening 31 on the first end portion 11 side, that is, closer to the first end portion 11 of the housing; a second opening 32 in the second end portion 12 side, that is, closer to the second end portion 12 of the housing; and a plurality of through holes 34 formed at intervals in a circumferential direction in a portion of a peripheral wall portion 33 close to the first opening 31, that is, on the first opening 31 side. In one example, the number of the through holes 34 is preferably 2 to 6. In addition, intervals of the through holes 34 in the circumferential direction may be the same or different from each other. The through holes 34 each can be, for example, circular, oval, rectangular, or the like.

As can be seen in FIG. 3, a portion of the peripheral wall portion 33 on the first opening 31 side of the cylinder 30 has a first crimped portion 35 crimped inward, and a portion of the peripheral wall portion 33 on the second opening 32 side has a second crimped portion 36 crimped inward. The igniter 20 is accommodated and disposed in the cylinder 30 on the first opening 31 side, that is, close to the first opening 31, and the projectile 40 is accommodated and disposed in the cylinder 30 on the second opening 32 side, that is, closer to the second opening 32 than the first opening 31.

The first opening 31 is closed by the igniter 20 attached thereto, and a fitting portion 15, into which a connector connected to a power source by a lead wire is fitted when in use, is formed between the igniter 20 and an opening of the first end portion 11. The igniter 20 includes a resin portion 23 in which a part of an igniter main body portion including an ignition portion 21 and an electro-conductive pin 22 is surrounded by a resin, and the ignition portion 21 protrudes from the resin portion 23.

The projectile 40 has a large diameter portion 41 on the first opening 31 side, that is, closer to the first opening 31, and a small diameter portion 42 on the second opening 32 side, that is, closer to the second opening 32, and has a relationship of an outer diameter (d1) of the large diameter portion 41>an outer diameter (d2) of the small diameter portion 42, and an annular inclined surface portion 45 is formed at a boundary between the large diameter portion 41 and the small diameter portion 42 due to a difference between the outer diameters. An angle of the annular inclined surface portion 45 preferably corresponds to an angle of an inner surface of the second crimped portion 36. Note that the annular inclined surface portion 45 may be an annular flat surface portion 45 defined in a radial direction (an angle between the large diameter portion 41 or the small diameter portion 42 and the annular flat surface portion 45 is approximately 90 degrees), and at this time, the angle of the inner surface of the second crimped portion 36 is preferably also approximately 90 degrees. The large diameter portion 41 of the projectile 40 includes a recessed portion 44 on a bottom surface portion facing the first opening 31, and the ignition portion 21 of the igniter 20 is fitted into the recessed portion 44.

The outer diameter (d1) of the large diameter portion 41 and the outer diameter (d2) of the small diameter portion 42 of the projectile 40, and an inner diameter (id) of the second opening 32 of the cylinder 30 has a relationship of d1>id≥d2. Thus, during operation, the small diameter portion 42 can pass through the second opening 32, but the large diameter portion 41 cannot pass through the second opening 32.

The resin portion 23 of the igniter 20 includes a first disc portion 24, a second disc portion 25, a third disc portion 26, and a fourth disc portion 27 that are formed in this order from the ignition portion 21 side toward the electro-conductive pin 22 side. A peripheral surface of the first disc portion 24 is abutted against the inner wall surface of the cylinder 30.

The second disc portion 25 has a non-uniform outer diameter having recesses and protrusions on the peripheral surface. In one example, protruding portions 25a intermittently protrude from a peripheral surface having the same diameter as the first disc portion 24 in the circumferential direction, and recessed portions are formed between the protruding portions. Each of the protruding portions 25a of the recesses and protrusions enters the corresponding one of the plurality of through holes 34 on the first opening 31 side of the cylinder 30 to close the through hole 34.

A peripheral surface of the third disc portion 26 is abutted against the inner wall surface of the cylinder 30. An outer diameter (D1) of the first disc portion 24 and an outer diameter (D3) of the third disc portion 26 are the same. The fourth disc portion 27 has a diameter smaller than the diameter of the third disc portion 26 and axially enters the first opening 31 of the cylinder 30 to close the first opening 31, and a part of the fourth disc portion 27 protrudes axially outward from the first opening 31.

An annular surface 28 is formed between the third disc portion 26 and the fourth disc portion 27 because the outer diameter (D3) of the third disc portion 26 and an outer diameter (D4) of the fourth disc portion 27 have a relationship of D3>D4. The first crimped portion 35 is abutted against the annular surface 28. The igniter 20 is fixed to the cylinder 30 by the protruding portions 25a of the second disc portion 25 of the resin portion entering the plurality of through holes 34 on the first opening 31 side of the cylinder 30 and the first crimped portion 35 being abutted against the annular surface 28 of the resin portion 23.

The conductor piece 50 is configured to form a part of an electric circuit when the electric circuit breaker device 1 is attached to the electric circuit. The conductor piece 50 is a plate piece including a first connection portion 51 and a second connection portion 52 on both ends thereof and a cut portion 53 at an intermediate portion of these connection portions.

The first connection portion 51 and the second connection portion 52 are configured to connect to other conductors in the electric circuit (e.g., a lead wire). The cut portion 53 is configured to be cut and interrupt the electric circuit when activated. In the example illustrated in FIG. 1, two fragile portions are formed in a surface of the cut portion 53 on a side facing the first end portion 11, while no fragile portion is formed on the opposite side. However, configurations in which fragile portions are formed on the opposite side or on both sides are also possible. In the conductor piece 50 and the projectile 40, an end surface 43 of the projectile 40 is axially opposed to the cut portion 53.

The insulated space 60 is a space for holding a conductor piece 50 of the cut portion 53 of a conductor during operation, and in FIG. 1, the cut portion 53 is surrounded by a stopper member 62 made of a resin except for a portion facing the insulated space 60. Note that other materials may be used for the stopper member 62. In addition, an opening that forms the insulated space 60 of the stopper member 62 can have a size and shape corresponding to those of the small diameter portion 42 of the projectile 40.

Next, operations when the electric circuit breaker device 1 illustrated in FIG. 1 is disposed in a part of an electric circuit of an electric vehicle will be described. The electric circuit breaker device 1 illustrated in FIG. 1 can be combined with a sensor or the like that detects an abnormal current and, for example, when an abnormal current flows to the electric circuit, can automatically initiate an operation or can also be actuated artificially.

When the electric circuit breaker device 1 is disposed in an electric circuit, the first connection portion 51 and the second connection portion 52 of the conductor piece 50 are connected to the lead wire that forms the electric circuit. When an abnormality occurs in the electric circuit, the igniter 20 is activated and a combustion product containing combustion gas is generated from the ignition portion 21. The combustion product generated from the ignition portion 21 collides with the recessed portion 44 of the large diameter portion 41 of the projectile 40.

The projectile 40 that has received pressure by the combustion product moves axially to cut the cut portion 53 of the conductor piece 50. At this time, the small diameter portion 42 of the projectile 40 is caused to protrude from the second opening 32 of the cylinder 30 to cut the cut portion 53, but the outer diameter (d1) of the large diameter portion, the outer diameter (d2) of the small diameter portion of the projectile 40, and the inner diameter (id) of the second opening 32 of the cylinder 30 have a relationship of d1>id≥d2, and thus the annular inclined surface portion 45 between the large diameter portion 41 and the small diameter portion 42 collides with the second crimped portion 36 of the second opening 32 to stop the movement of the projectile 40. At this time, the annular inclined surface portion 45 collides with the second crimped portion 36 of the second opening 32 to close the second opening 32 of the cylinder, so that even in a case where a slight combustion product leaks from between the cylinder 30 and the large diameter portion 41 of the projectile 40, the combustion product does not leak from the second opening 32 to the insulated space 60.

Thereafter, when a cut piece of the cut portion 53 moves into the stopper member 62 of the insulated space 60, the opening of the stopper member 62 facing the insulated space 60 is in a state of being blocked by the small diameter portion 42 of the projectile 40, and thus the cut piece of the cut portion 53 does not return to the conductor piece 50 side. Through this operation, the first connection portion 51 and the second connection portion 52 on both ends of the conductor piece 50 are electrically disconnected, so that the electric circuit in which the electric circuit breaker device 1 is disposed is broken.

Figure 2:
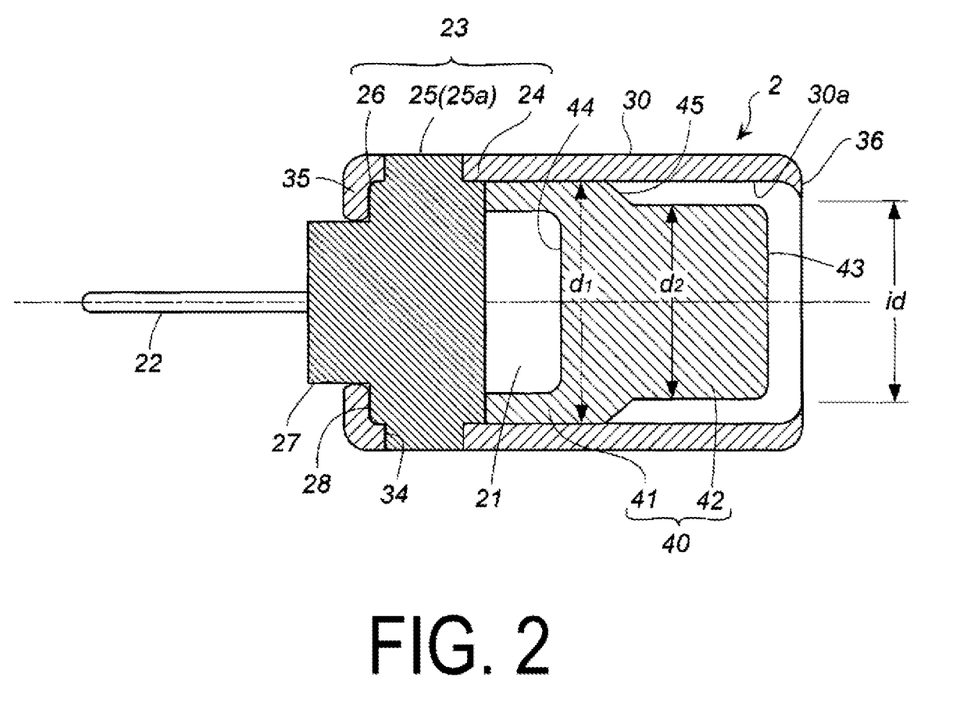
FIG. 2 is an enlarged view of an exemplary projectile assembly included in the electric circuit breaker device of FIG. 1.
Figure 3:
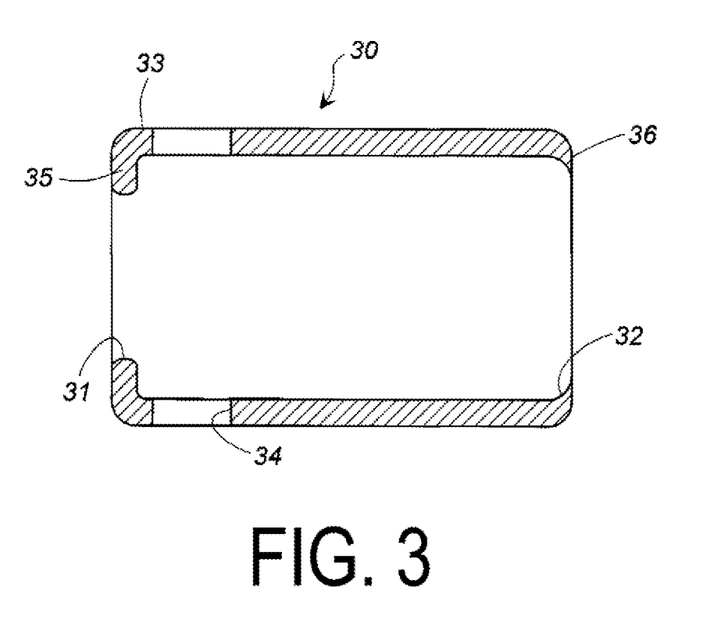
FIG. 3 is an enlarged view of an exemplary cylinder included in the electric circuit breaker device of FIG. 1.

Method for Manufacturing a Projectile Assembly Used in an Electric Circuit Breaker Device Although a method for manufacturing the projectile assembly 2 illustrated in FIG. 2 will be described with reference to FIGS. 4(a) to 4(c), the method for manufacturing the projectile assembly illustrated in FIG. 2 is not limited to the following manufacturing method. Note that in the following steps, two or more steps may be integrated to one step, or one step may be divided into two or more steps.

Figure 4:
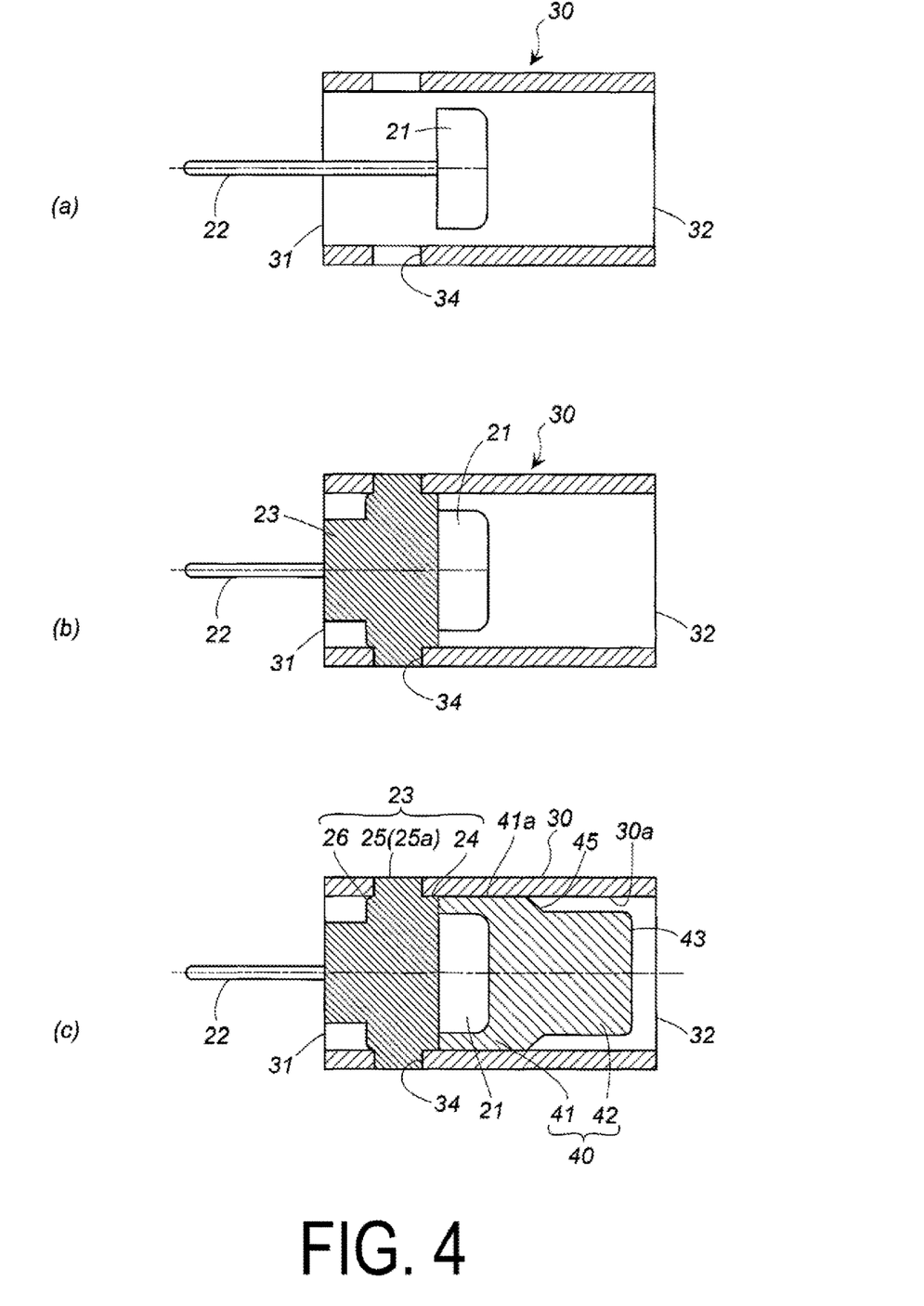
FIGS. 4(a) to 4(c) are explanatory views of exemplary assembly steps of the projectile assembly of FIG. 2.

In a first step, the cylinder 30 illustrated in FIG. 4(a) is prepared, the cylinder 30 having the first opening 31, the plurality of through holes 34 formed at intervals in the circumferential direction in a portion of the peripheral wall portion 33 on the first opening 31 side, that is, close to the first opening 31, and the second opening 32.

Next, as illustrated in FIG. 4(a), the igniter main body portion (having the ignition portion 21 and the electro-conductive pin 22, and no resin portion 23) is disposed in the cylinder 30. At this time, the igniter main body portion is disposed such that the ignition portion 21 is not radially opposed to the through holes 34 and is positioned axially closer to the second opening 32 than the through holes 34, the electro-conductive pin 22 is radially opposed to the through holes 34 in a portion near the ignition portion 21, and about a half of the length of the electro-conductive pin 22 is positioned outside the first opening 31 of the cylinder 30. Next, the cylinder 30 in which the igniter main body portion is disposed is placed in a mold. Any mold having a configuration with which the resin portion 23 illustrated in FIG. 4(b) can be formed can be used as the mold.

In a second step, as illustrated in FIG. 4(b), a resin is injected from the first opening 31 side of the cylinder 30 to form the resin portion 23 of the igniter 20. At this time, because the resin also enters the through holes 34 of the cylinder 30, the resin portion 23 is fixed to the cylinder 30, and the igniter 20 is also fixed to the cylinder 30 via the resin portion 23. The ignition portion 21 is not covered by the resin and remains exposed.

In a third step, as illustrated in FIG. 4(c), a resin is injected from the second opening 32 side of the cylinder 30 to form the projectile 40. At this time, any mold with which the projectile 40 illustrated in FIG. 4(c) can be formed can be used as the mold. When the resin is injection-molded to form the projectile 40, the resin is cooled and solidified from a molten state upon injection, and thus an outer surface 41a of a large diameter portion 41 of the projectile 40 is attached to an inner wall surface 30a of the cylinder 30 and the ignition portion 21 and is not movable before actuation.

In a fourth step, both a portion of the peripheral wall portion 33 on the first opening 31 side and a portion of the peripheral wall portion 33 on the second opening 32 side, of the cylinder 30, are crimped to form the first crimped portion 35 and the second crimped portion 36, and the resin portion 23 of the igniter is fixed by the first crimped portion 35 to obtain the assembly 2 (FIG. 2). Because the outer diameter (d1) of the large diameter portion, the outer diameter (d2) of the small diameter portion of the projectile 40, and the inner diameter (id) of the second opening 32 of the cylinder 30 have a relationship of $d1 > id \geq d2$, the small diameter portion 42 can pass through the second opening 32, but the large diameter portion 41 cannot pass through the second opening 32 during operation. The ignition portion 21 of the igniter 20 becomes in a state of being fitted into the recessed portion 44 formed in the large diameter portion 41 of the projectile 40.

As described in the above example, the igniter 20 is fixed in the cylinder 30 by the resin portion 23 formed by injection molding, and the projectile 40 is formed of an injection-molded body in the cylinder 30. Thus, an operation of press-fitting the igniter 20 and the projectile 40 into the cylinder 30 is not required, and a load at the time of attachment, as in the case where the igniter 20 and the projectile 40 are press-fitted, is eliminated.

In addition, clearance of a contact portion between the cylinder 30 and the igniter 20 and clearance of a contact portion between the cylinder 30 and the projectile 40 are eliminated, so that no O-ring is required to be disposed between the cylinder 30 and the igniter 20 (resin portion 23) or between the cylinder 30 and the projectile 40. Furthermore, because clearance between the cylinder 30 and the igniter 20, and clearance between the cylinder 30 and the projectile 40 are eliminated, a combustion product including flames generated when the igniter 20 is actuated does not leak from between the cylinder 30 and the igniter 20 and between the cylinder 30 and the projectile 40, and all combustion products collide with the projectile 40 to be used to move the projectile 40.

In the projectile assembly 2 of FIG. 2, in a case where the projectile 40 formed in advance as a molded body is disposed, the projectile 40 may jump out of or retract in the cylinder 30 due to external vibrations, leading to repetitive collision with the conductor piece 50. However, in the projectile assembly 2 of FIG. 2, the projectile 40 is lightly attached to the inner wall surface 30a of the cylinder and the ignition portion 21, so that the projectile 40 does not jump out of or retract in the cylinder 30 due to external vibrations, and when receiving pressure from the igniter 20 upon actuation, the projectile 40 instantaneously moves to cut the conductor piece 50. Furthermore, a distance between the projectile 40 and the conductor piece 50 is ensured, so that when the conductor piece 50 is broken, it is possible to sufficiently utilize a kinetic energy during operation.

INDUSTRIAL APPLICABILITY

The electric circuit breaker device of the present disclosure including a projectile assembly can be disposed in various types of electric circuits and is particularly suited to be used in an electric circuit including a battery (e.g., lithium ion battery) of an automobile, an electric circuit of an electric vehicle, an electric circuit of a home appliance, a power station, a solar power generation device, a distribution board of various types of factories, and a stationary battery using an industrial battery such as an industrial lithium ion battery and an industrial lead storage battery.

REFERENCE SIGNS LIST

1 Electric circuit breaker device
10 Housing
20 Igniter
23 Resin portion
30 Cylinder
31 First opening
32 Second opening
34 Through hole
40 Projectile
50 Conductor piece
60 Insulated space

The invention claimed is:

1. A projectile assembly in which a projectile and an igniter are accommodated and disposed in a cylinder, wherein
the cylinder includes a first opening, a second opening axially opposite to the first opening, and a plurality of through holes formed at intervals in a circumferential direction in a peripheral wall portion on a side of the first opening,
the igniter includes: an igniter main body portion provided with an ignition portion and an electro-conductive pin; and a resin portion surrounding the igniter main body portion,
the resin portion closes the first opening and the plurality of through holes of the cylinder and is abutted against an inner wall surface around the through holes of the cylinder,
the projectile is made of a synthetic resin,
the igniter is disposed on the side of the first opening in the cylinder and the projectile is disposed between the igniter and the second opening in the cylinder, and
both a peripheral wall portion on the side of the first opening and a peripheral wall portion on a side of the second opening of the cylinder are crimped inward to form a first crimped portion and a second crimped portion, and the first crimped portion is abutted against the resin portion of the igniter.

2. The projectile assembly according to claim 1, wherein the projectile includes a large diameter portion on the side of the first opening of the cylinder and a small diameter portion on the side of the second opening of the cylinder, and has a relationship of an outer diameter (d1) of the large diameter portion>an outer diameter (d2) of the small diameter portion, and
an inner diameter (id) of a portion of the second opening of the cylinder, in which the second crimped portion is present, has a relationship of d1>id≥d2.

3. An electric circuit breaker device, wherein
in a housing made of a synthetic resin, an igniter, a projectile made of a synthetic resin, and a conductor piece for forming a part of an electric circuit are disposed in this order from a side of a first end portion of the housing toward a side of a second end portion on a side opposite to the side of the first end portion in a housing axial direction, and an insulated space is closed between the second end portion and the conductor piece,
a cylinder is disposed in the housing, and the igniter and the projectile are disposed in the cylinder,
the cylinder includes a first opening on the side of the first end portion of the housing, a second opening on the side of the second end portion of the housing, and a plurality of through holes formed at intervals in a circumferential direction in a peripheral wall portion on a side of the first opening,
the igniter includes: an igniter main body portion provided with an ignition portion and an electro-conductive pin; and a resin portion surrounding the igniter main body portion,
the resin portion closes the first opening and the plurality of through holes of the cylinder and is abutted against an inner wall surface around the through holes of the cylinder,
both a peripheral wall portion on the side of the first opening and a peripheral wall portion on a side of the second opening of the cylinder are crimped inward to form a first crimped portion and a second crimped portion, and the first crimped portion is abutted against the resin portion of the igniter,
the conductor piece is a plate piece including a first connection portion and a second connection portion on both end sides and a cut portion at an intermediate portion, and a surface of the cut portion is disposed perpendicularly to the housing axial direction, and
the projectile is opposed to the cut portion of the conductor piece in the housing axial direction.

4. The electric circuit breaker device according to claim 3, wherein
the resin portion of the igniter includes a first disc portion, a second disc portion, a third disc portion, and a fourth disc portion formed in this order from a side of the ignition portion toward a side of the electro-conductive pin,
a peripheral surface of the first disc portion is abutted against the inner wall surface of the cylinder,
the second disc portion has a non-uniform outer diameter having recesses and protrusions on a peripheral surface, and protruding portions of the recesses and protrusions enter the plurality of through holes on the side of the first opening of the cylinder,
an outer diameter (D1) of the first disc portion and an outer diameter (D3) of the third disc portion are identical, and a peripheral surface of the third disc portion is abutted against the inner wall surface of the cylinder,
an annular surface is formed between the third disc portion and the fourth disc portion by the outer diameter (D3) of the third disc portion and an outer diameter (D4) of the fourth disc portion having a relationship of D3>D4, and
the peripheral wall portion on the side of the first opening of the cylinder is crimped inward to form the first crimped portion, and the first crimped portion is abutted against the annular surface.

5. The electric circuit breaker device according to claim 3, wherein the projectile includes a large diameter portion on the side of the first end portion of the housing and a small diameter portion on the side of the second end portion of the housing, and has a relationship of an outer diameter (d1) of the large diameter portion>an outer diameter (d2) of the small diameter portion, and
an inner diameter (id) of the second opening of the cylinder has a relationship of d1>id≥d2.

6. The electric circuit breaker device according to claim 3, wherein the projectile includes a large diameter portion on the side of the first end portion of the housing and a small diameter portion on the side of the second end portion of the housing, and has a relationship of an outer diameter (d1) of the large diameter portion>an outer diameter (d2) of the small diameter portion, and
the ignition portion of the igniter is disposed in a state of entering a recessed portion formed in the large diameter portion.

7. A method for manufacturing a projectile assembly in which a projectile and an igniter are accommodated and disposed in a cylinder described in claim 1, the method comprising:
a first step of preparing a cylinder having: a first opening; a plurality of through holes formed at intervals in a circumferential direction in a peripheral wall portion on a side of the first opening; and a second opening, disposing an igniter main body portion in the cylinder, and then disposing the cylinder and the igniter in a mold;

a second step of injecting a resin from the side of the first opening of the cylinder to form a resin portion of the igniter;

a third step of injecting a resin from a side of the second opening of the cylinder to form the projectile; and a fourth step of crimping both the peripheral wall portion on the side of the first opening and a peripheral wall portion on the side of the second opening of the cylinder to form a first crimped portion and a second crimped portion, and fixing the resin portion of the igniter by the first crimped portion to obtain the projectile assembly.

8. A method for manufacturing an electric circuit breaker device described in claim 3, the method comprising disposing a projectile assembly including a projectile made of a resin in a housing.

9. The electric circuit breaker device according to claim 4, wherein the projectile includes a large diameter portion on the side of the first end portion of the housing and a small diameter portion on the side of the second end portion of the housing, and has a relationship of an outer diameter (d1) of the large diameter portion>an outer diameter (d2) of the small diameter portion, and an inner diameter (id) of the second opening of the cylinder has a relationship of d1>id≥d2.

10. The electric circuit breaker device according to claim 4, wherein the projectile includes a large diameter portion on the side of the first end portion of the housing and a small diameter portion on the side of the second end portion of the housing, and has a relationship of an outer diameter (d1) of the large diameter portion>an outer diameter (d2) of the small diameter portion, and the ignition portion of the igniter is disposed in a state of entering a recessed portion formed in the large diameter portion.

11. The electric circuit breaker device according to claim 5, wherein the projectile includes a large diameter portion on the side of the first end portion of the housing and a small diameter portion on the side of the second end portion of the housing, and has a relationship of an outer diameter (d1) of the large diameter portion>an outer diameter (d2) of the small diameter portion, and the ignition portion of the igniter is disposed in a state of entering a recessed portion formed in the large diameter portion.

12. A method for manufacturing a projectile assembly in which a projectile and an igniter are accommodated and disposed in a cylinder described in claim 2, the method comprising:

a first step of preparing a cylinder having: a first opening; a plurality of through holes formed at intervals in a circumferential direction in a peripheral wall portion on a side of the first opening; and a second opening, disposing an igniter main body portion in the cylinder, and then disposing the cylinder and the igniter in a mold;

a second step of injecting a resin from the side of the first opening of the cylinder to form a resin portion of the igniter;

a third step of injecting a resin from a side of the second opening of the cylinder to form the projectile; and a fourth step of crimping both the peripheral wall portion on the side of the first opening and a peripheral wall portion on the side of the second opening of the cylinder to form a first crimped portion and a second crimped portion, and fixing the resin portion of the igniter by the first crimped portion to obtain the projectile assembly.

* * * * *